Oct. 31, 1933.  A. I. MARCUM  1,932,417
AUTOMOTIVE VEHICLE
Original Filed Oct. 19, 1927  2 Sheets-Sheet 1
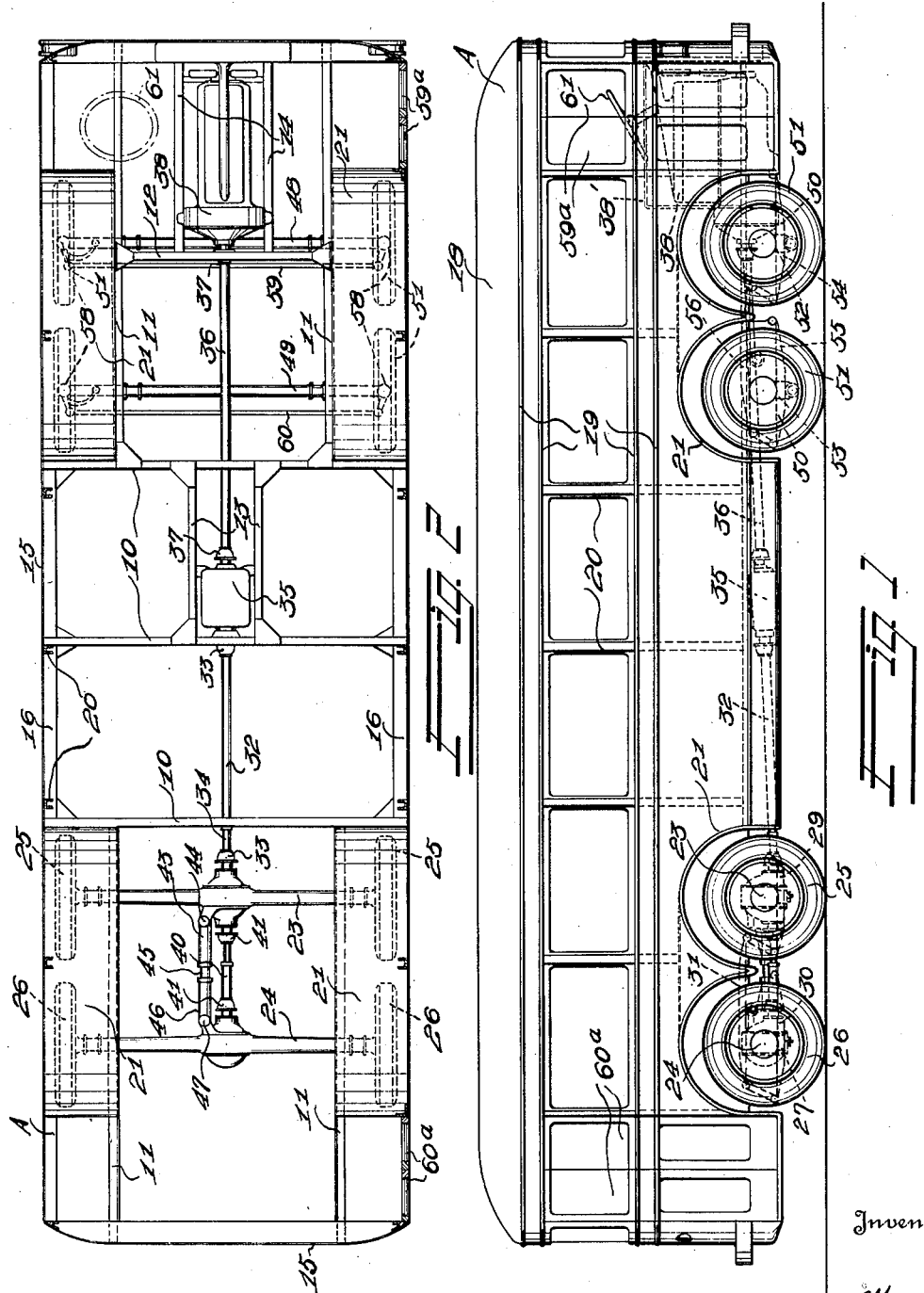
Inventor
Arthur I. Marcum
By William A. Strauch
Attorney

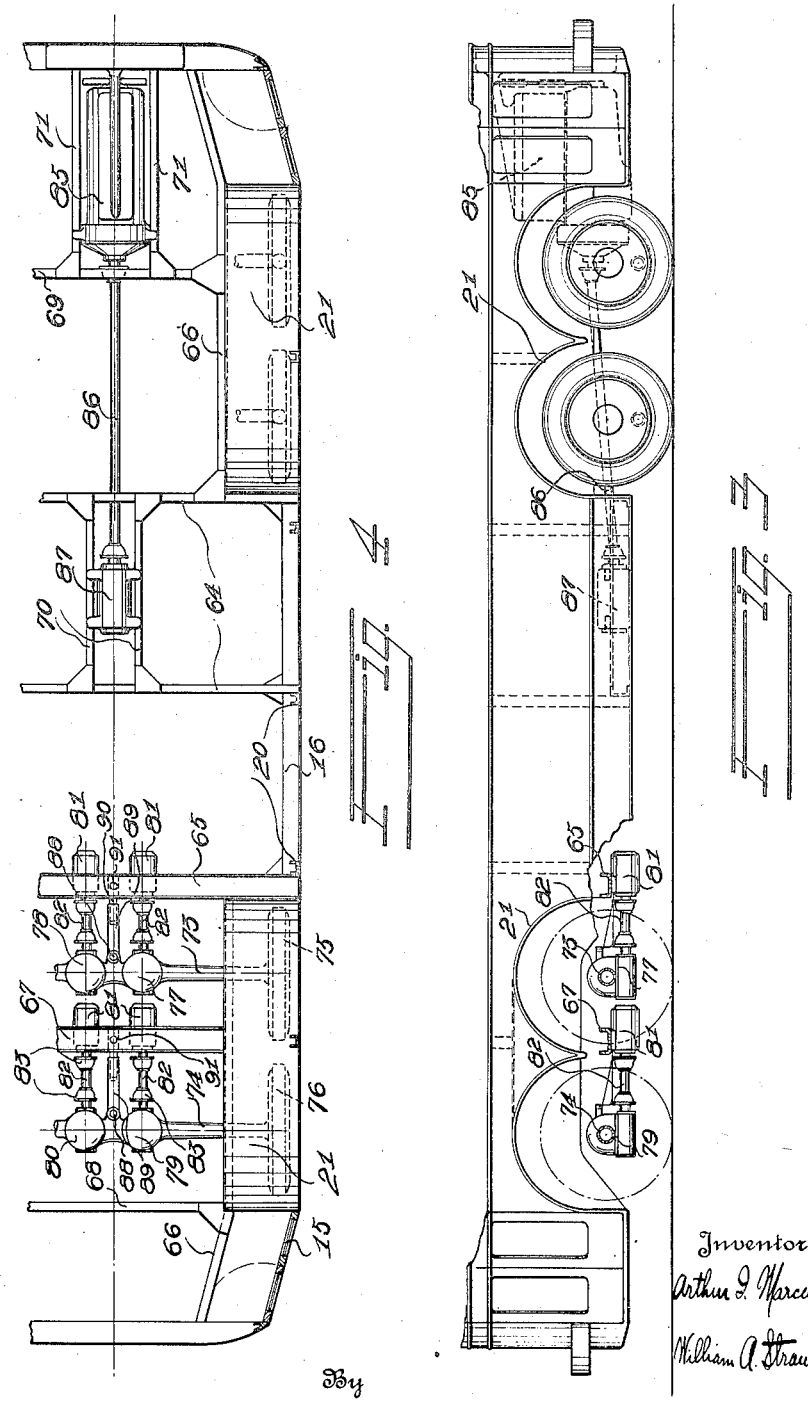

Patented Oct. 31, 1933

1,932,417

UNITED STATES PATENT OFFICE 1,932,417

AUTOMOTIVE VEHICLE

Arthur I. Marcum, Oakland, Calif., assignor, by mesne assignments, to Automotive Engineering Corporation, a corporation of Delaware Application October 19, 1927, Serial No. 227,281
Renewed January 13, 1933

4 Claims. (Cl. 180—54)

The present invention relates to new and useful improvements in automotive vehicles.

One of the objects of the present invention is the provision of an automotive vehicle in which the body thereof is so constructed as to directly support the power unit, transmission and driving mechanism thereby eliminating the usual heavy chassis.

A further object of the invention is the provision of an automotive vehicle, the body of which is adapted to support the power unit, driving mechanism and wheels such that substantially the entire base area of the body may be utilized in carrying passengers or merchandise.

A still further object of this invention is the provision of an automotive vehicle comprising a novel arrangement of body, power and transmission devices, and wheels such that the parts will be maintained in better balanced relation than in the usual construction of automotive vehicles whereby the stresses caused by unbalanced mounting of heavy parts are largely eliminated.

A further object of the invention is to provide a road vehicle having a box-like body built up of relatively light structural members, which body is used to support as well as house a forwardly disposed internal combustion engine, said engine being so disposed within the body that substantially all of the space on both sides of said engine is available for the carrying of passengers or commodities.

A still further object of the invention is to provide a road vehicle of the gas-electric type that includes at least four driven wheels in which a separate motor is provided to drive each wheel, said motors being operated from a unitary power unit supported and carried by said body.

A still further object of the invention is to provide a road vehicle embodying a plurality of driven axles, each wheel of which is driven independently of every other driven wheel, and in which the wheel driving means are disposed adjacent the longitudinal central line of the vehicle, whereby the flexible shafts of said means are substantially unaffected by the separational movement of the axles as the vehicle rounds a curve when the weight of the body is thrown toward one side of the vehicle, thus deflecting the springs causing separation of the axles at that side.

A still further object of the invention is to provide a multi-wheel vehicle including a motor for driving each wheel independently of every other wheel, embodying flexible torque resisting means so disposed with reference to the drive shaft of said motors, that said torque resisting means not only effectively resists the torque reactions but at the same time substantially maintains the flexible motor drive shafts in a straight line.

Other objects of the invention and the means by which the various above enumerated objects are accomplished as well as the benefits derived therefrom will be referred to in the course of the following description.

For a more complete understanding of the present invention reference will be made to the accompanying drawings forming part of this application and in which:

Figure 1 is a side elevational view of the vehicle.

Figure 2 is a longitudinal sectional view showing the relation of the power and driving mechanism to the body.

Figure 3 is a fragmental side elevational view similar to Figure 1 but disclosing a modification in the power and driving mechanism as well as the ends of the body construction, and Figure 4 is a partial longitudinal sectional view of the construction illustrated in Figure 3.

The instant invention hereinafter described is embodied in a vehicle for the conveyance of passengers and merchandise intended to perform the same function as standard forms of automotive stages or busses.

This invention differs from the conventional form of automotive vehicle propelled by a self-contained power generating unit such as an internal combustion engine or gas-electric combination in that, in place of providing a chassis of the usual heavy construction and to which the body is secured, the chassis is eliminated and the body so constructed as to directly support the power and transmission mechanism, thus providing a construction which is lighter but stronger and more durable than the commonly employed heavier construction.

Referring to the drawings by reference characters in which like characters designate like parts A designates the vehicle body which body comprises a base supporting and strengthening portion consisting of substantially equally spaced transversely extending bars 10 which extend the full width of the body and also longitudinal bars 11 extending from and connected at one end to bars 10 and extending in opposite directions terminating at the front and rear ends of the body respectively. The front bars 11 are connected intermediate their ends by a transversely extending cross bar 12. A pair of laterally spaced longitudinally extending bars 13 extend between and are connected to the two adjacent front bars 10, and a pair of laterally spaced longitudinally extending bars 14 are connected to and extend from the bar 12 to the front end of the body.

Side and end walls 15 are provided which, like the members 10, 11, 12, 13 and 14, are of relatively light weight material, preferably sheet metal. The walls of the body are supported and strengthened by angle bar stiffeners 16 at the inner edges thereof. The outer ends of the bars 10, 11 and 14 are secured thereto. A suitable top 18 is secured to the upper margin of the side and end walls 15. The side and end walls and top or roof are stiffened or strengthened by longitudinal members 19 and vertical members 20.

The members 19 and 20 are preferably angle iron bars of U-shape in section as indicated in Figure 2 and the lower ends of members 20 are supported on and connected to the marginal angle bar stiffeners 16.

All of the frame members entering into the construction of the body are of relatively light gage particularly so as compared with the ordinary heavy chassis frame members and yet due to their arrangement in box-like form and their rigid connection with the walls and roof provide a body that constitutes a trussed structure well adapted to support the power and transmission means.

A further means for strengthening the body is provided by the wheel housings 21, which are bowed as indicated on the drawings and are secured to members 11 and the side walls 15 in any approved manner. The base portion is provided with a suitable floor which extends the full width and length of the body except for the wheel housings and the engine which project into the box like body above the floor line thereof. However, the height of the wheel housings is approximately the ordinary height of the seats of a passenger vehicle, and, preferably, seats are arranged over said housings whereby the available space for carrying passengers is not reduced by the projection of said housings in the body.

The rear end of the body is supported by a pair of parallel drive axles 23 and 24 each of which is supported by a pair of pneumatic tired wheels 25 and 26 respectively.

Supported from the housings of each of the axles 23 and 24 by means of suitably journaled or universal ball and socket joints or connections are the spring supporting saddles 27.

Secured to and supported from the saddles 27 at points intermediate their ends and preferably at the rear of the centers thereat are pairs of springs 29 and 30, the rear ends of which are connected to the ends of equalizing springs 31 by link connections as more fully set forth in copending application Serial No. 54,560 filed September 4, 1925, now Patent No. 1,815,416 dated July 21, 1931. Drive axle 23 is preferably a through drive axle of the type disclosed in co-pending application Serial No. 705,482 filed April 10, 1924, now Patent No. 1,670,119 dated May 15, 1928 in which a compensating differential drive mechanism is provided between the differential drives for the wheels 25 and 26.

The compensating differential in the axle 23 is driven from the forward end of the vehicle by means of the propeller shaft 32 which is provided with the universal drive connections 33 and a splined or telescoping drive connection 34.

The front universal joint 33 of the propeller shaft 32 is driven from a mid-ship transmission 35 suitably supported by the parallel bars 13 of the base portion and which in turn is driven by means of a shaft 36 provided with universal joints or flexible drive connections 37 which is driven from an engine 38 of any suitable type. The engine 38 together with the transmission 35 and shafts 32 and 36 are preferably placed in the base portion at a slight angle with the shafts 32 and 36 substantially alined. The engine 38 which projects into the box like frame as above pointed out, is arranged centrally of the forward end of the body and is covered by a suitable cover 38' that surrounds said engine.

The engine cover 38' just referred to, is substantially spaced from the wheel housings on each side of the vehicle providing an aisle on each side of said cover for a purpose hereinafter to be described.

The rear drive axle 24 is of any standard or well known type and is driven by means of an intermediate telescoping or splined shaft 40 provided with universal or flexible joints 41. Shaft 40 is driven from the through drive shaft of the axle 23 as fully set forth in co-pending application Serial No. 705,482 before referred to. As either journaled or universal connections are provided between the axles 23 and 24 and the springs 29 and 30 provision must be made to prevent rotation of the axles about the supporting wheel centers and to compensate for the driving and braking reactions.

This compensation is preferably effected independently of the body and supporting springs in order to permit free movement of the axles with relation to the body under road conditions. Accordingly a torquing socket member 43 is connected to suitable extensions of the axle 23 by means of a vertical pivot pin 44. A torque rod 45 is provided with one end thereof rigidly secured in the socket 43 and the other end thereof fits slidably and rotatably into a socket member 46 which is secured to extensions of the axle 24 by means of a vertical pivot pin 47. By this construction a limited relative movement in all directions of the axles 23 and 24 with relation to each other and at the same time a compound rotary motion of the axles with relation to the body is permitted, but rotation of the axles about the centers of the wheels 25 and 26 is prevented, and the shaft 40 is maintained in substantial straight line under road conditions because of the proximity of the torque resisting connection. The forward end of the body is supported on tandem axles 48 and 49 by spring suspensions indicated as a whole by the numeral 50. Each axle carries a pair of dirigible wheels 51.

At this point it should be noted that the vehicle could be equipped with only one front axle and accompanying pair of steering wheels without any change in the body construction and arrangement of the power and drive mechanism except for the reinforcement or housing 21 which would be modified if only one pair of steering wheels were employed.

Journaled on the axle 48 are the spring supporting saddles 52 and journaled on the axle 49 are the spring supporting saddles 53. Secured to the saddles 52 and 53 are the leaf springs 54 and 55 respectively. The springs 54 and 55 are connected at their rear ends to the opposite ends of an equalizing leaf spring 56 by link connections as more fully set forth in my co-pending application Serial No. 54,560.

The dirigible wheels 51 are secured to the axles 48 and 49 by king pins 58 preferably arranged vertically and with their axes substantially in the planes bisecting the tread surface of the wheels.

Drag links 59 and 60 extending parallel to the axles connect the wheels for simultaneous movement about the pins 58. A steering wheel 61 is provided and is operatively connected with the drag links as specifically set forth in my co-pending application Serial No. 102,744 filed February 17, 1926, now Patent No. 1,818,902 dated Aug. 11, 1931.

Adjacent the forward end of the body, suitable doors 59a are provided, while adjacent the rear end of the body doors 60a are provided. As clearly shown on Figure 2, doors 59a are positioned forwardly of the forward wheel housing 21 whereby passengers may be admitted to the body of the vehicle by entering the body at this point and passing through the aisle between the engine cover 38' and the housing 21. The driver of the vehicle preferably occupies the space on the opposite side of the engine from the doors 59a just referred to, and controls the operation of said doors in a well known manner. The doors 60a control the exit from the body of the vehicle such doors being arranged at the extreme rear of the vehicle body and between the rear wheel housing 21 and the rear wall to the body. By disposing the entrance to the vehicle body as above pointed out, and arranging the steering mechanism of the vehicle at the extreme forward end of the vehicle body, great economies of space can be obtained over ordinary constructions since in such constructions the space on the opposite side of the engine is not utilized.

In Figures 3 and 4 a modification of the structure above described is disclosed which consists in employing a gas-electric combination and modifying the base portion of the body to accommodate the said gas-electric combination. More specifically, in the modification the base portion comprises a pair of parallel transversely extending bars 64 of a length equal to the width of the body, a transversely extending channel iron bar 65 rearward of the bars 64, longitudinally extending bars 66 secured at adjacent ends to the forward bar 64 and bar 65 respectively and extending therefrom to the front and rear ends of the body. A transversely extending channel iron bar 67 between the rear longitudinal bars 66 intermediate the ends thereof rearward of bar 65 and has its ends secured to the bars 66. Rearward of bar 67 is a transversely extending bar 68 secured at its ends to the bars 66. A transversely extending bar 69 has its ends secured to the forward pair of bars 66 intermediate the ends thereof. Intermediate the ends of the bars 64 is a pair of transversely spaced longitudinally extending bars 70. A pair of transversely spaced longitudinally extending bars 71 have the rearward ends thereof secured to the bar 69 intermediate the ends thereof. As shown in Figure 4 the ends of the bars 66 adjacent the front and rear ends of the body are converged inwardly toward the longitudinal center line of the base portion parallel to the similarly converged ends of the side wall members hereinafter referred to to provide narrow end portions on the body. It will also be observed upon reference to Figure 4 that the bars 65 and 67 are of heavier construction than the other bars to provide attaching means for the power and transmission mechanism later referred to.

The side and end walls, roof and wheel housings are of the same construction as that disclosed in Figures 1 and 2 and are accordingly designated by the same reference characters.

The rear end of the body is supported by a pair of drive axles 73 and 74 which are supported by the pairs of pneumatic tired wheels 75 and 76 respectively.

The drive axles 73 and 74 in this form of the invention are each provided with a pair of gear mechanisms preferably of the worm type. The arrangement is such that either wheel of either axle may be independently driven. Thus the axle 73 is provided with the independent gear mechanisms 77 and 78 and the axle 74 is provided with the gear mechanisms 79 and 80. Said gear mechanisms are arranged adjacent the longitudinal center of the vehicle.

Each gear mechanism is separately and independently driven by means of an electric motor 81, the motors associated with the axle 73 being secured to the transverse frame member 65 and the motors associated with the axle 74 being secured to the frame member 67. Each gear mechanism is driven by means of a shaft 82 interposed between the gear mechanism and respective electric motor and provided with universal or flexible joints 83.

Suitably supported by the bars 71 of the box-like body is an internal combustion engine 85 which by means of the shaft 86 operates the electric generator 87 which supplies current to the motors 81 by ordinary electrical connections between the generator and various electric motors.

In this form of the invention provision is also made to prevent rotation of the drive axles about the supporting wheel centers which is accomplished in the following manner.

Pivotally secured to an extension of axle 73 between the gear mechanisms thereat by means of a vertical pin 88 is a socket member 89 adapted to slidably and rotatably receive one end of a torque rod 90 which at its other end is pivoted to the bar 65 by means of a ball and socket pivot pin 91. A similar torque connection is provided between the axle 74 and bar 67 as clearly shown in Figure 4. The spring suspensions and steering mechanisms employed in this form of the invention are similar to those employed in the construction shown in Figures 1 and 2 and hereinbefore described.

From the above detailed description it will be seen that an automotive vehicle is provided in which the body thereof is so constructed as to be comparatively light and yet very durable and further adapted to accommodate the maximum number of passengers due to the utilization of the entire base area thereof, and that the elements entering into the formation of the base portion of the body are so related as to accommodate the power and drive mechanism, and that the utilization of the commonly used comparatively heavy chassis construction is avoided.

Having set forth my invention what I claim and desire to secure by United States Letters Patent is:—

1. A road vehicle comprising a box-like body including relatively light structural members extending longitudinally of the body at the sides thereof, transverse members rigidly connecting said longitudinal members, end members connecting said longitudinal members, relatively short longitudinal members arranged between one of said transverse members and the forward one of said end members, a relatively short transverse member between said short longitudinal members, other longitudinal members designed to support the engine arranged between the forward end member and said short transverse member, and wheel housings supported by the longitudinal side members, said housings projecting within said body.

2. A road vehicle comprising a box-like body including relatively light structural members extending longitudinally of the body at the sides thereof, transverse members rigidly connecting said longitudinally members, end members connecting said longitudinal members, relatively short longitudinal members arranged between certain of said transverse members and said end members and wheel housings supported by the longitudinal side members and certain of said relatively short longitudinal members, said housings projecting within said body.

3. A motor bus designed for carrying passengers, including a box-like body composed of a plurality of relatively light longitudinal and transverse members rigidly connected together, an internal combustion engine arranged entirely within the body and supported on certain of said members at the extreme end of said body, a passenger entrance adjacent the forward end of said body and arranged directly adjacent one side of said internal combustion engine, and a space formed between the other side of said internal combustion engine and the other side of the body to accommodate the driver and such vehicle controlling means as the steering wheel and the steering mechanism.

4. A motor bus designed for carrying passengers, including a box-like body composed of relatively light longitudinal and transverse structural members rigidly secured together, wheel housings arranged adjacent each corner of said body, an internal combustion engine arranged within the extreme forward end of the body and supported thereby, an entrance into the body at one side of said internal combustion engine, and a housing for said engine within the body, said housing being arranged so as to leave aisles between portions of said engine housing and said forwardly disposed wheel housings.

ARTHUR I. MARCUM.